United States Patent [19]
Gustafson

[11] 3,824,460
[45] July 16, 1974

[54] LEAKAGE SENSOR
[76] Inventor: Reuben V. Gustafson, 228 W. 17th St., New York, N.Y. 10011
[22] Filed: Apr. 2, 1973
[21] Appl. No.: 346,977

[52] U.S. Cl............... 324/61 R, 317/246, 340/200, 340/235
[51] Int. Cl........................................... G01r 27/26
[58] Field of Search.............. 324/61 P, 61 R, 65 P; 317/246; 340/200, 235, 244 C; 73/304 C

[56] References Cited
UNITED STATES PATENTS

| | | | |
|---|---|---|---|
| 2,529,015 | 11/1950 | Goudime-Levkovitsch et al. | 317/246 |
| 2,647,234 | 7/1953 | Pear, Jr. | 324/65 P |
| 3,078,707 | 2/1963 | Weaver | 324/65 P |
| 3,175,527 | 3/1965 | Deaner | 324/61 P |
| 3,356,979 | 12/1967 | Bouyoucos | 324/65 P |
| 3,365,936 | 1/1968 | Hubin et al | 324/61 P |
| 3,383,863 | 5/1968 | Berry | 324/65 P |
| 3,389,601 | 6/1968 | Semplak | 324/61 P |

FOREIGN PATENTS OR APPLICATIONS

| | | | |
|---|---|---|---|
| 289,738 | 7/1953 | Switzerland | 324/61 P |
| 925,656 | 5/1963 | Great Britain | 324/61 P |

Primary Examiner—Stanley T. Krawczewicz
Attorney, Agent, or Firm—Kenyon & Kenyon Reilly Carr & Chapin

[57] ABSTRACT

An improved capacitive sensing system adapted for use in detecting the presence of a liquid on a floor or the like in which the sensing probe comprises a pair of encased wires held essentially parallel to each other by a plurality of spaced webs which are an extension of casing of the wires, the probe being held flat on the floor over a considerable length so that leakage anywhere along the probe will result in a capacitance change which may be sensed and an appropriate alarm activated in response thereto.

12 Claims, 5 Drawing Figures

PATENTED JUL 16 1974

LEAKAGE SENSOR

BACKGROUND OF THE INVENTION

This invention relates to leakage sensing in general and more particularly to an improved sensing system for detecting liquid leadage over a wide area.

In large installations of electronic equipment such as computers or the like, the equipment is generally placed upon a raised floor and interconnecting cables between various pieces of equipment run underneath the floor. This permits ease of interconnecting the various units and of trouble-shooting when problems arise. Such equipment generates a significant amount of heat and is generally provided with air-conditioning and cooling. Thus, under the partition, along with the interconnecting cables, will be found in many instances pipes carrying liquids such as water used in airconditioning. A leak in one of these pipes will not be immediately detected by operating personnel because of the raised floor. By the time such a leak is detected it may have caused an amount of water on the under floor which can cover the cables and cause serious problems and damage the ceiling and equipment of the floor below. In addition, moisture therefrom may find its way into the electronic equipment and cause serious damage. Thus, it is important that some form of leak detecting means be installed in the area beneath the raised floor to detect any leakage from liquid carrying pipes which may run therethrough. Since installations of this nature are generally of a quite large size, and leakage may occur anywhere within the total area underneath the raised floor, such a sensing device must be capable of detecting leakage over large areas. In general, prior art leakage or moisture detectors have had the capability of sensing such leakage or moisture only within a small area. Thus, it would be possible to cover large areas by installing a large number of such devices. However, this solution becomes costly and cumbersome. Thus, there is need for a single system which can detect leakage over large areas.

One method known in the prior art of detecting the presence of a liquid such as water is through the use of capacitive sensors. In general term, a capacitor sensor is connected to an oscillator of some sort and changes either in frequency or current are detected and used to provide an output indication of either the presence of liquid or the amount or percentage of moisture. A typical system of this nature is disclosed in U.S. Pat. No. 3,710,244. In that particular system, a high frequency oscillator is coupled through a transformer to a capacitive probe. A sensing circuit is provided which drives a meter to indicate moisture percentage and provides an output to comparison device used to control a valve. As in other prior art system however the sensor is of a limited size and will not effectively solve the problem presented in detecting leaks under raised floors. Other capacitive sensing systems have been used to measure liquid levels. One such system is supplied by Amiprodux, Inc. of New York, New York. In a manner similar to the system disclosed in the above identified U.S. patent, a capacitive probe is coupled to a high frequency oscillator and a sensing circuit attached thereto to sense current or voltage which will change as the capacitance changes. Sensors in such systems will either provide an output to drive a meter to indicate a percentage of liquid levels or may comprise a conventional triggering circuit which is set to trigger at a certain voltage or current indicating a particular high or low liquid level. In this system as in other prior art systems the capacitive probe is designed for use in a vertical arrangement within a tank or the like and is not particularly suited for detecting leakage over large areas of floor. Thus, it will be recognized that there is a need for a sensing system which may be used to detect leakage on a floor or the like.

SUMMARY OF THE INVENTION

The present invention provides a capacitive sensing system which can effectively detect liquid leakage over wide areas. The sensing probe comprises two parallel wires encased in plastic material such as polyethylene, PVC or Teflon spaced by webbed portions made of the same material so as to form a flat cable assembly which may be installed on the floor where leakage is to be detected in a simple and convenient manner. In operation, a leak on the floor will cause liquid to fill in the spaces between the two wires where the web is not present changing the dielectric constant therebetween and thus changing the overall capacitance of the sensor resulting in a change of current through the capacitor which is detected by conventional sensing means to provide an output alarm. For example, with three-quarter inch spacing of the wires, detection of a leak will occur in a sensor at least 70 foot long if only approximately one foot of the sensor has water in its open spaces. By selection of the wire spacing as a function of length, runs in excess of 100 feet are possible.

DETAILED DESCRIPTION OF THE PREFERRED EMBODIMENT

Figure 1:
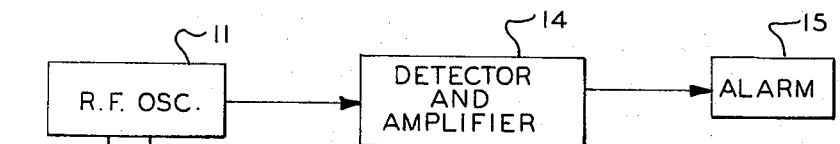
FIG. 1 is a block diagram of the sensing system of the present invention.
Figure 1:
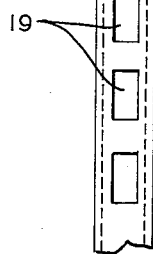

FIG. 1 illustrates in schematic form the sensing system of the present invention. An RF oscillator 11 has an output which is provided into a circuit including the capacitor formed by the encased spaced wired 13 with openings 19. The capacitance between the wires 13 will be equal to:

$$C = KA/d$$

where $K =$ the dielectric constant;

$A =$ the wire area; and $D =$ the distance between the wires.

Thus, the capacitance is a function of the dielectric constant K of the material between the two wires. The impedance of the capacitor formed by the wires 13 will be equal to:

$$Xc = 1/2\pi fC$$

As capacitance changes, the impedance and the current flow through the capacitor is changed. Thus, as water comes between the spaces between the two wires 13, which formerly were separated by air, the dielectric constant and in turn the capacitance changes and with it the current flowing through the capacitor. This change of current is detected by a detector 14 and amplifier to trigger a detecting circuit which will provide an output to alarm 15 to be described below. The circuits of block 11, 14 and 15 are conventional circuits and will not be described herein. As noted above, a device containing the circuits is available from Amiprodux, Inc. of New York.

Figure 2:
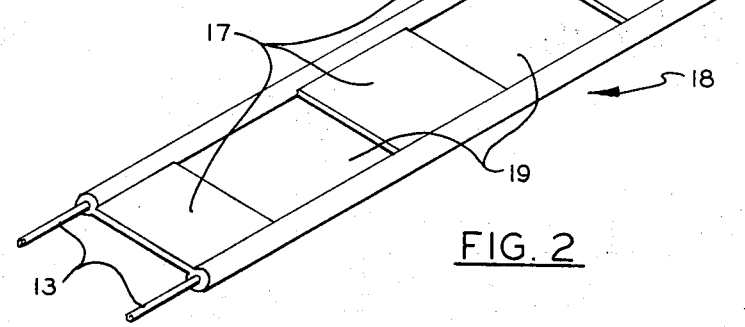
FIG. 2 is a perspective view of a section of the sensing probe of the present invention.

The structure of the sensing probe of the present invention is shown on FIG. 2 in its basic form. The two wires 13 are enclosed within a plastic material or the like (such as polyethylene, PVC or Teflon) with spacing webs 17 provided to maintain a constant spacing between the two wires. The whole sensing probe may be molded or extruded in one piece or made in other convenient fashion forming an essentially flat, flexible cable which may be easily attached to the floor in a manner to be described below. The far ends of the sensing probe 18 will be insulated to prevent current flow between the wires at the end in case of accidental shorting. (The current flow in the circuit is low and there is no danger to personnel. However, shorting would set the alarm.) With no liquid on the floor, the capacitance of the sensor 18, which may be made of any length desired, will be determined from the variables d, the spacing between the wires A, the cross-sectional area of the wires and the dielectric constants of air and the web material between the wires. A, the area, will be a function of the length of the wire and its size. Thus, it can be seen that as longer runs of the sensor 18 are used, the capacitance can be made to remain constant by increasing the value of d, i.e., the distance between the two wires. After installation on a dry floor, the detector 14 of FIG. 1 may be adjusted so as to not provide an alarm output. If a leak occurs and some of the spaces 19 of FIG. 2 have water therebetween the dielectric constant K will change causing a change in capacitance and the resulting current change will be sensed by the detector and cause an output to the alarm of FIG. 1. (Water has a dielectric constant of 81 as compared with air having a dielectric constant of 1. Thus, the change will be significant.) The sensing probe configuration in which a substantial portion of the space between the wires is open to allow the water to replace air is critical if the system is to sense water at a small percentage of the full length. Similarly, proper spacing is important and it is thought that a minimum spacing of ¾ inch should be used where relatively long runs of the sensing probe are used.

Figure 3:
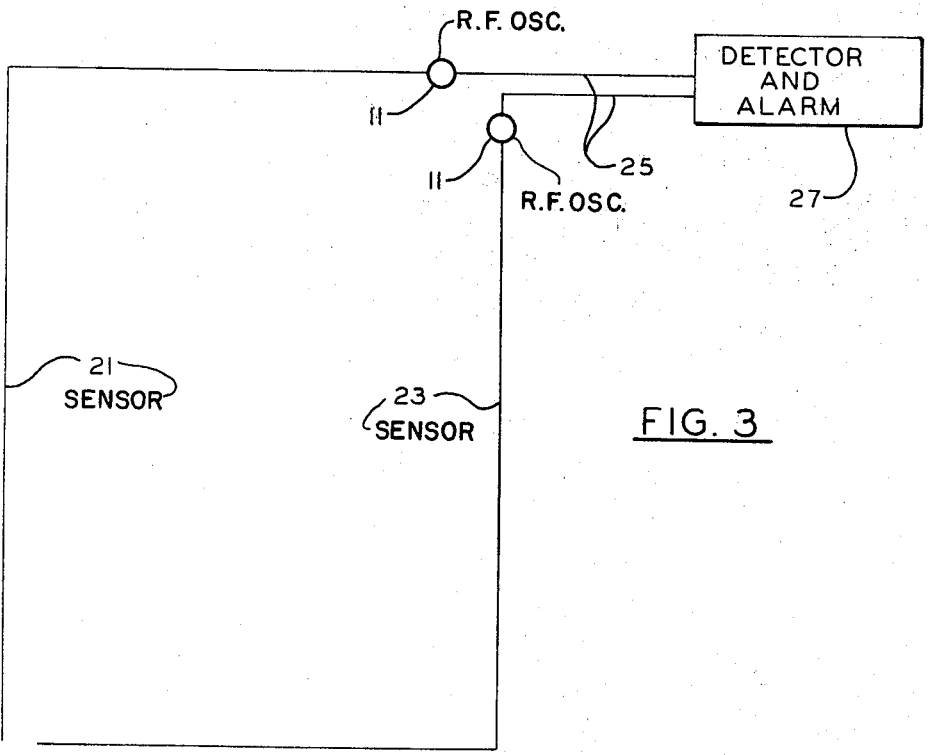
FIG. 3 is a plane view of a typical system layout using the sensing probe of the present invention.

FIG. 3 illustrates a typical layout for an installation utilizing the sensing system of the present invention. As shown, two RF oscillators 11 are used to supply two separate sensing probes 21 and 23 covering a large area under a computer floor, for example. The two transmitters 11 are than connected via wiring 25 to a detector circuit and alarm panel 27 such as that described above.

Figure 4:
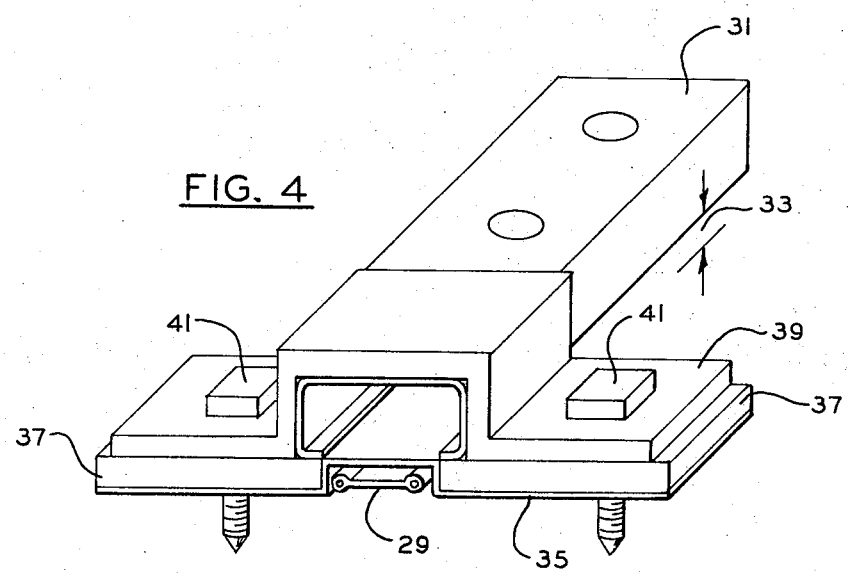
FIG. 4 is a perspective view of the manner in which the sensing probe of the present invention may be mounted to a floor.

FIG. 4 illustrates a method of mounting the sensing probe of the floor in a manner such that it is electrically insulated and protected from being stepped on, or damaged while installing or moving other equipment. The sensing probe 29 is placed flat on the floor and has placed over it a channel 31. The channel 31 is held off the floor with a clearance of in the vicinity of a quarter inch as indicated by the dimension 33. Both the channel 31 and the sensing probe 29 are held down on the floor by brackets spaced along the length of the channel 31 and sensing probe 29. At each point of attachment, the sensing probe is covered with a strip of plastic or the like 35 to hold the probe flat against the floor. On each side of the sensing probe is placed a spacer 37 under the channel 31 which will provide the quarter inch or so clearance from the floor. The plastic strip 35 is held between the floor and the spacers which holds the sensing probe in place. The edges of the channel 31 rest on a portion of the spacers 35. An attaching strap 39 is placed over the channel 3 and the spacers 37 and both held in place by threaded studs 41, passing through holes in the strap 39 and spacers 37, which are driven into or screwed into the floor. The spacers 37, channel 31 and strap 39 may be made of plastic or metal. Plastic is preferable to avoid any effects which metal may have on the sensing probe 29. Although only one set of holddown means comprising the spacers 37, bracket 39 and studs 41 are shown it will be recognized that these will be provided at spaced intervals to provide the required support for the channel 31 and the sensor 29. The clearance 33 which is present in the areas between the brackets and spacers permits water or other fluids which may leak on to the floor to flow under the channel 31 and interact with the capacitive sensor 29 in the manner described above. The channel and the bracket and spacers provide structural support to hold the sensor in place and to protect it once it is installed.

Figure 5:
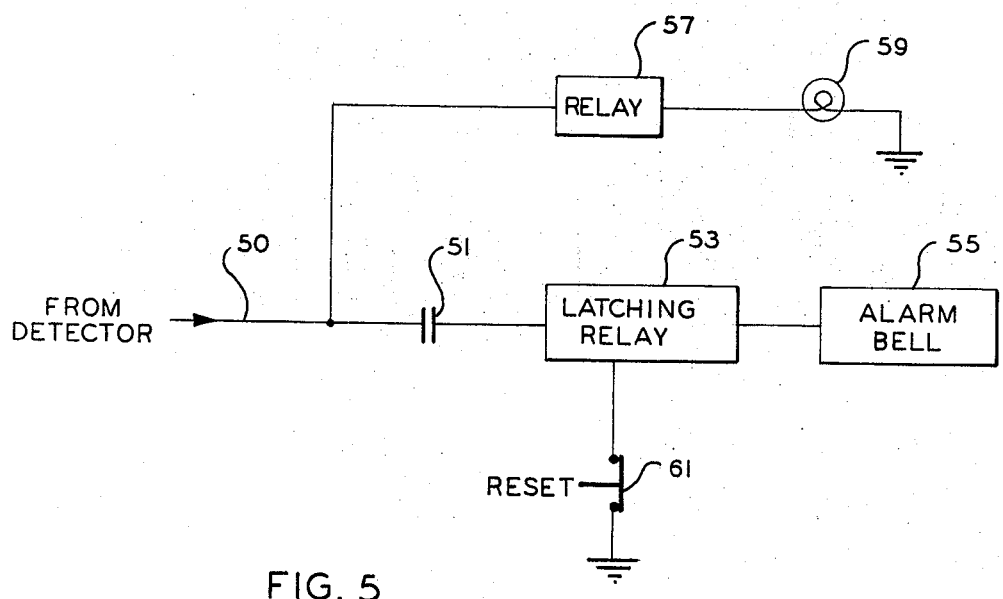
FIG. 5 is a block-schematic diagram of an alarm system.

FIG. 5 shows in simplified form an alarm system which may be used with the present invention. Detector 14 of FIG. 1 will provide an output on line 50 when liquid is sensed. This is coupled through a capacitor 51 to a latching relay 53 which provides power to an alarm bell 55 in response to the input. Line 50 will also operate a relay 57 which drives an indicator 59. Relay 53 has its ground connected through a switch 61. When a leak is detected alarm 55 will sound and lamp 59 (which may be made blinking in conventional fashion) will light. Pressing switch 61 will reset the alarm bell, but lamp 59 will remain on until the sensing probe is dried and the output on line 50 returns to normal and releases relay 57.

In one installation where this system was provided, with a run of a sensing probe having three quarter inch spacing for a length of approximately 70 feet, the system was capable of sensing a leak when water was present along a section of approximately one foot of the sensor length. As noted above, longer runs are possible with an increased spacing between the wires in the flat sensor.

Thus, an improved capacitive sensing system which is particularly useful in detecting leakage underneath the floor of computer installations and the like has been shown. Although a specific embodiment has been illustrated and described, it will be obvious to those skilled in the art that various modifications may be made without departing from the spirit of the invention which is to be limited solely by the appended claims.

What is claimed is:

1. An elongated capacitive sensing probe for sensing the presence of a liquid at any place along the length of the probe, comprising a flat cable having a length in excess of five feet made of first and second wires encased in an insulating material and supported substantially parallel to each other at a distance of greater than ½ inch by a plurality of spaced webs extending from the casing of one to the casing of the other such that over a substantial portion of the length of the cable there are open spaces between the encased wires, the wires extending out of the casings at one end of the cable to permit attachment to a capacitive sensing device and insulated at the other end, whereby when a liquid is present between the open spaces over a length as small as in the range of 2 % a change in the capacitance will occur of magnitude sufficient to operate a sensing alarm.

2. The invention according to claim 1, wherein said casing and said webs are integral with each other.

3. The invention according to claim 2 wherein said casing and webs are made of a plastic material.

4. The invention according to claim 3 wherein said plurality of webs is formed by first encasing said first and second wires with a continuous web connecting them and selectively cutting away portions of said web to form a plurality of connecting webs with spaces between them.

5. The invention according to claim 2 wherein said plurality of webs are equally spaced along the length of said cable.

6. The invention according to claim 2, wherein said sensing probe cable is placed on a floor to sense leakage of a fluid onto the floor and further including:
   a. a protective channel placed over said sensing probe cable; and
   b. a plurality of attaching means at spaced intervals for holding said channel and said cable to the floor and to hold said channel off said floor so that leakage may reach said cable.

7. The invention according to claim 6, wherein each of said attaching means comprise:
   a. first and second spacers placed on opposite sides of said cable with said channel resting on said spacers;
   b. a bracket placed over said channel and resting on said first and second spacers; and
   c. first and second securing removable means inserted through said bracket on each side and said first and second spacers into the floor to hold said bracket, said spacers and said channel in place.

8. The invention according to claim 7 wherein said first and second securing means comprise threaded drive studs.

9. The invention according to claim 7 and further including a strip of thin plastic extending between said first spacer and the floor, over said cable and between said second spacer and the floor holding said cable in place.

10. A liquid sensing system to provide an indication of the presence of a liquid on a floor comprising:
    a. means for sensing changes in capacitance and providing an output alarm when a predetermined change occurs;
    b. an elongated capacitive sensing probe having a length of at least five feet comprising first and second wires encased in a plastic insulating material which further extends between the casing of one and the other at spaced intervals to maintain said wires substantially parallel to each other and separated by at least ½ inch thereby forming a flat cable with spaced open areas between the encased wires, said wires extending from the casings at one end and coupled to the said sensing means; and
    c. means to hold said flat cable substantially flat on the floor whereby liquid leakage will enter at least some of the open spaces in said cable to change its capacitance which will be sensed by said sensing means thereby resulting in an alarm indicating the leakage.

11. The invention according to claim 10 wherein said system is placed on the sub floor under a raised floor on which electronic equipment is installed with the cables between portions of said equipment resting on the sub floor.

12. The invention according to claim 10 wherein said output alarm comprises:
    a. an aural output means;
    b. a visual output means; and
    c. means to reset said aural output means with said visual means remaining on until the sensing probe is dry.

* * * * *